United States Patent
Iwasaki (12)
(10) Patent No.: US 6,216,142 B1
(45) Date of Patent: *Apr. 10, 2001

(54) DESK TOP PUBLISHING METHOD OF LAYING PARTS ON LEAF PATTERN AND METHOD OF DISPLAYING LEAF PATTERN

(75) Inventor: Taiji Iwasaki, Minamiashigara (JP)

(73) Assignee: Fuji Photo Film Co., Ltd., Kanagawa-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/089,441

(22) Filed: Jun. 3, 1998

(30) Foreign Application Priority Data

Jun. 3, 1997 (JP) .................................................. 9-145478
Jun. 9, 1997 (JP) .................................................. 9-150919

(51) Int. Cl.[7] .................................................. G06F 15/00
(52) U.S. Cl. .................................................. 707/517
(58) Field of Search .................................. 707/517–530, 707/500; 345/302, 115–133, 334, 342; 281/3.1, 22, 15.1

(56) References Cited

U.S. PATENT DOCUMENTS 5,283,864 * 2/1994 Knowlton .............................. 345/350
5,907,837 * 5/1999 Ferrel et al. .............................. 707/3

OTHER PUBLICATIONS

Jostens, YearTech Guide to Desktop Publishing Yearbook, YearTech, pp. 2, 2–3, 2–4, 2–10, 2–22, 5–24, 7–31, n–2, n–13, n–18, and n–19, 1992.*
Weinman, Quarkxpress for Macintosh, Peachpit Press, 1993, p 135.*

* cited by examiner

Primary Examiner—Kim Vu
Assistant Examiner—Alford W. Kindred
(74) Attorney, Agent, or Firm—Sughrue, Mion, Zinn, Macpeak & Seas, PLLC (57) ABSTRACT

Leaf pattern data and parts data representing the shapes of parts including back signatures, register marks, etc. are managed separately from each other. The leaf pattern data includes parts name data and parts position data representing parts position coordinates. When only parts content data of the parts data are corrected, the shapes of parts in the leaf pattern data can be changed. For data output, the leaf pattern data and the parts data are merged and outputted to display a leaf pattern with actual images inserted therein on a display unit.

15 Claims, 7 Drawing Sheets

DESK TOP PUBLISHING METHOD OF LAYING PARTS ON LEAF PATTERN AND METHOD OF DISPLAYING LEAF PATTERN

BACKGROUND OF THE INVENTION

1. Field of the Invention

The present invention relates to a method of laying parts on a leaf pattern and a method of displaying a leaf pattern, for use in desktop publishing (DTP) applications in which images including characters are applied to electronic pages by computer processing.

2. Description of the Related Art

For producing a printed product containing pages, e.g., a book of many pages in a certain appearance, according to a DTP process, it is necessary for the operator to first determine a leaf pattern indicating how many pages are to be assigned to a single large leaf. Then, based on the total number of pages of the printed product, the operator determines the total number of leaf patterns required. The number of leaf patterns required can easily be determined by dividing the total number of pages of the printed product, e.g., "n" if the individual pages range from 1st to nth pages, by the number of pages contained in one leaf pattern.

Thereafter, the operator applies page layout data to each individual page on the first leaf pattern. The page layout data comprises a large amount of data, i.e., "heavy" data, as it contains images. The page layout data applied to individual pages are referred to as individual page data or page data.

Then, the operator applies parts data representative of register marks, a back signature, a back mark, a date of production, and a producer's name, etc. to the first leaf pattern, thus completing first imposed pattern data. Hereinafter, the imposed pattern data means a combination of leaf pattern data, a predetermined number of individual page data, and parts data. If the book has colored contents, then a predetermined number of individual page data for four color plates of C (cyan), M (magenta), Y (yellow), and K (black) are applied to the first leaf pattern, and parts data include color bar data indicating those color plates with rectangles surrounding letters "C", "M", "Y", "K".

Similarly, the operator applies individual page data and parts data to the remaining leaf patterns which range from the second leaf pattern to the nth leaf pattern, thereby completing second through final imposed pattern data.

The first through final imposed pattern data thus generated make up book data (printed product data), which are stored in a storage unit such as a hard disk or the like. The term "book" used herein means not only books, but also printed texts which are folded, including pamphlets, brochures, booklets, etc.

After the book data is completed, the operator may find it necessary to correct parts data in order to correct the shape of a part present in any arbitrary one of the determined leaf patterns.

The book data has such a data structure that the leaf pattern data, the individual page data, and the parts data are integrally combined with each other, i.e., are closely put together inseparably. It is highly difficult to identify the position or storage area of the storage unit where the parts data to be corrected is stored. As a result, it takes the operator a considerable time to correct parts, e.g., change a date of production, a producer's name, the content of a back signature, the shape of a back mark, or the shape of a color bar.

According to the conventional process of laying parts on leaf patterns, as described above, it is quite time-consuming for the operator to correct parts data because the amount of data that are closely put together inseparably is large.

SUMMARY OF THE INVENTION

It is therefore an object of the present invention to provide a method of laying parts on a leaf pattern while allowing parts data including a back signature, a back mark, a color bar, etc. laid on a leaf pattern to be corrected with utmost ease.

Another object of the present invention is to provide a method of laying parts on a leaf pattern while allowing parts data including a back signature, a back mark, a color bar, etc. laid on a leaf pattern to be corrected in a very short period of time.

Still another object of the present invention is to provide a method of displaying a leaf pattern to permit a leaf pattern with actual images added thereto to be confirmed easily on a display screen.

Yet still another object of the present invention is to provide a method of displaying a leaf pattern to permit a leaf pattern with images of laid parts and images of pages added thereto to be confirmed easily on a display screen.

The above and other objects, features, and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENT

Figure 1:
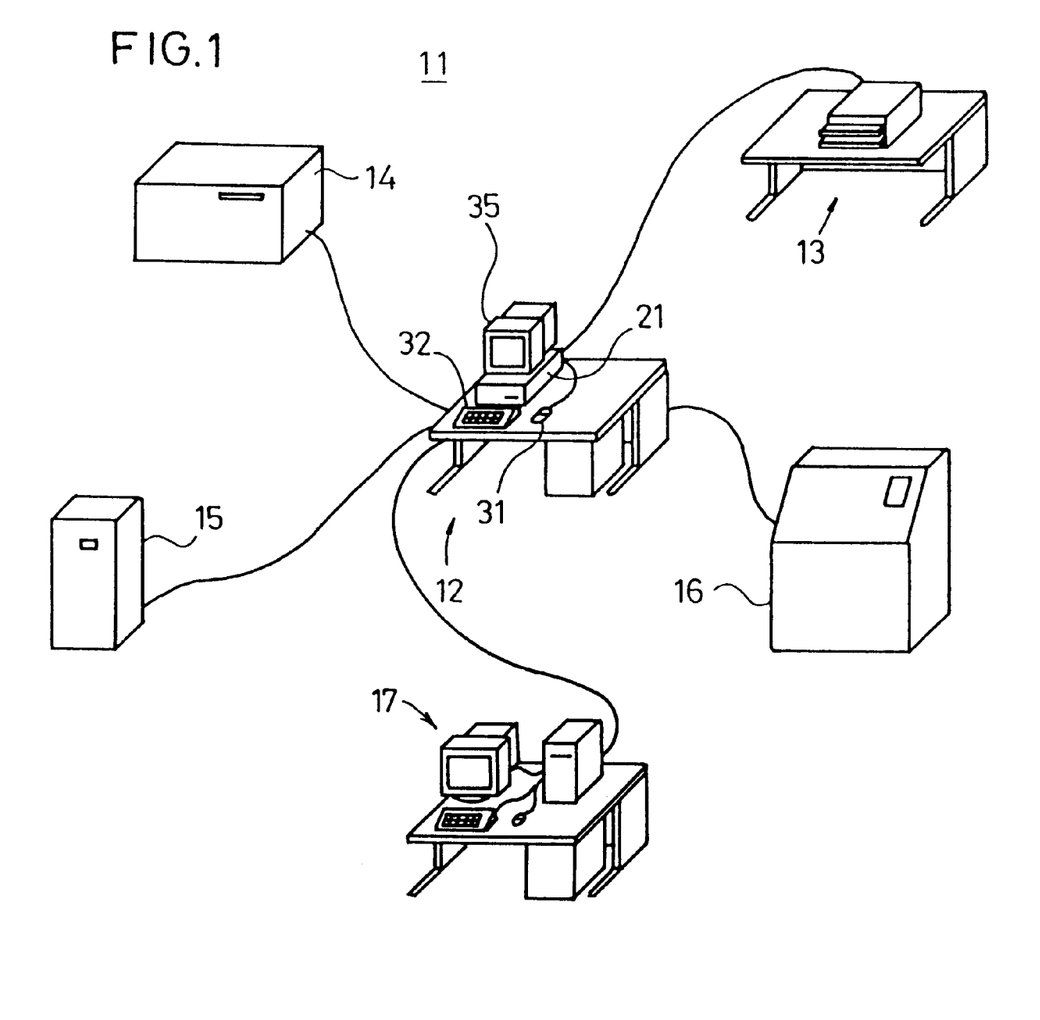
FIG. 1 is a schematic perspective view of a DTP system to which the principles of the present invention are applied.

FIG. 1 shows a DTP system 11 to which the principles of the present invention are applied.

As shown in FIG. 1, the DTP system 11 has a workstation 12 which can function as a server or an editing unit. The workstation 12 may be replaced with a personal computer capable of computer processing.

To the workstation 12, there is connected a PS (postscript) printer 13, functioning as an image output unit, for printing proofs of relatively low image quality at a relatively low cost in a short period of time.

To the workstation 12, there are also connected a monochromatic scanner 14 and a color scanner 15, each functioning as an image input unit, and a film printer 16 functioning as an image output unit.

The monochromatic scanner 14 reads a subject carrying a line drawing by way of raster scanning, and supplies a monochromatic image of line drawing data to the workstation 12. Therefore, the monochromatic scanner 14 also serves as a layout sheet input unit.

The color scanner 15 reads a subject carrying a color image by way of raster scanning, and supplies color-separated C, M, Y, K image data to the workstation 12.

The workstation 12 generates individual page data, i.e., edited data, bearing line drawings and images based on line drawing data and image data supplied from the monochromatic scanner 14 and the color scanner 15, and determines leaf patterns and generates page layouts for thereby generating imposed data.

The workstation 12 processes the generated imposed data for a layout based on output instructions, and thereafter converts the imposed data into a page description language such as a PS (postscript) language, for example, and supplies it to the film printer 16 and/or the PS printer 13.

The workstation 12 also processes the generated imposed data for a layout based on display instructions, i.e., preview instructions, and thereafter transfers the imposed data to a display memory 77 (described later on) for display on a display unit 35.

The film printer 16 has an image setter and a film processor, for example, for outputting printing films of high image quality. Usually, a printing plate is produced from a printing film, and is thereafter mounted on a rotary press and coated with ink. The ink coated on the printing plate is transferred to a sheet of paper, completing a printed product.

A plurality of editing workstations 17 are connected to the workstation 12 by a communication interface such as Ethernet or the like. Therefore, data can be exchanged and shared between the workstations 12, 17. For example, it is possible to function the workstation 12 as a server, and each of the workstations 17 as a client.

Figure 2:
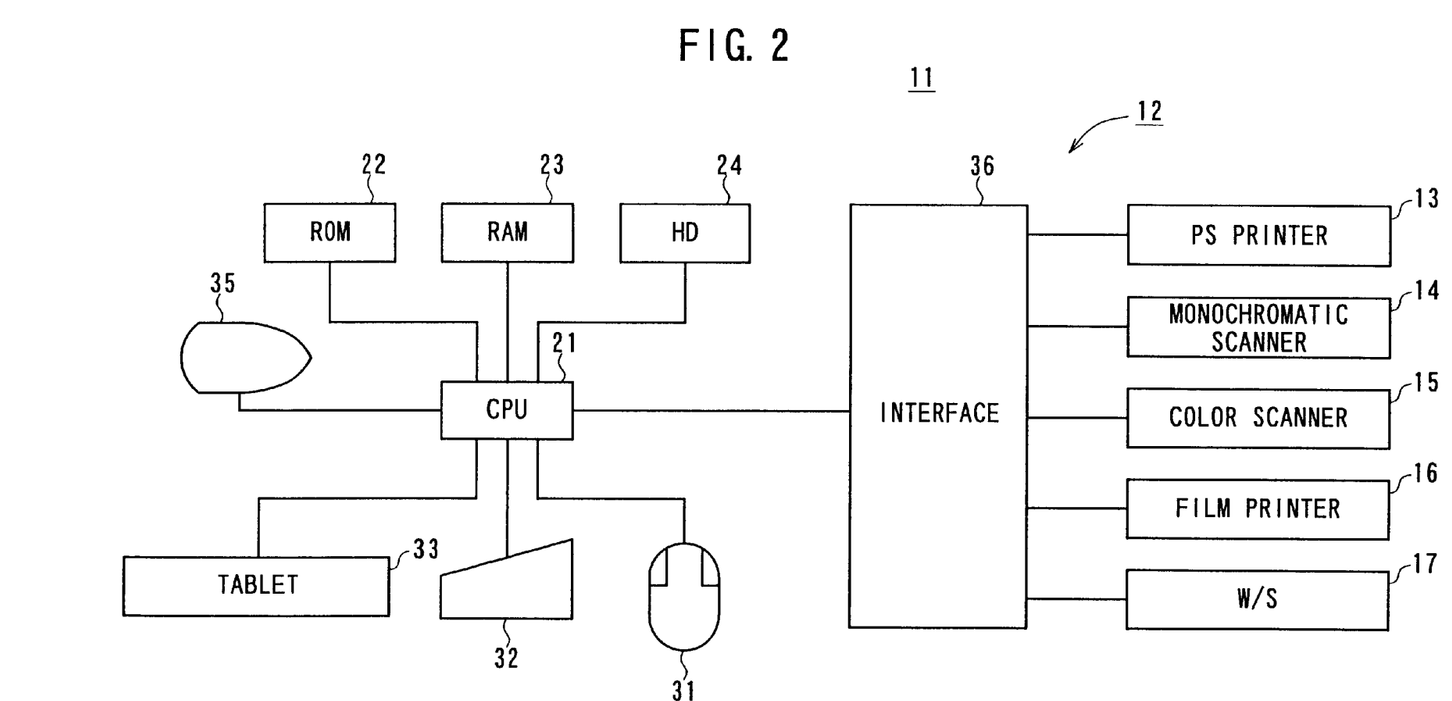
FIG. 2 is a block diagram of a workstation of the DTP system shown in FIG. 1.

FIG. 2 shows a general structure of the workstation 12. The workstation 12 comprises a CPU (Central Processing Unit) 21 serving as control means, processing means, and decision means. The CPU 21 is connected to a ROM (Read-Only Memory) 22 which stores a system program and other data, a RAM (Random-Access Memory) 23 serving as a work memory for storing temporary data, and an HD (Hard Disk) 24 for storing an application program and various data including imposed data, image data, etc. When the HD 24 is used as a data disk, the HD 24 is referred to as a data disk 24.

The CPU 21 is also connected to a mouse 31, a keyboard 32, and a tablet 33, each serving as a data entry unit and a pointing device (instructing device), and a display unit 35, which may be a 20-inch display unit, as an image display monitor.

The PS printer 13, the monochromatic scanner 14, the color scanner 15, and the film printer 16 are connected to an interface 36 which is connected to the CPU 21.

Figure 3:
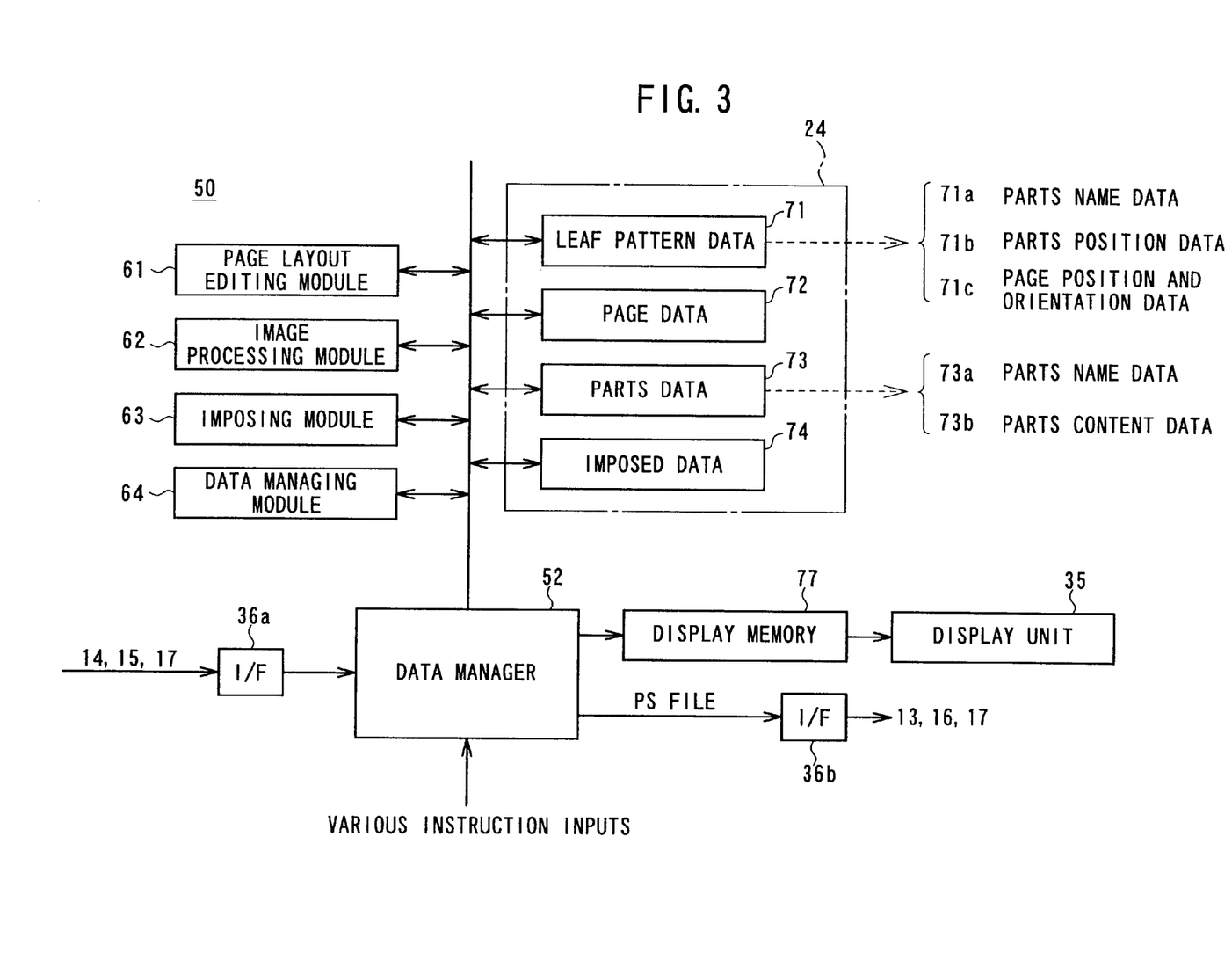
FIG. 3 is a functional block diagram of an imposed data generator which is a function performed by the workstation of the DTP system shown in FIG. 1.

FIG. 3 schematically shows an imposed data generator 50 which is a function performed by the workstation 12 including the CPU 12, the ROM 22, the RAM 23, and the HD 24 shown in FIG. 2.

The imposed data generator 50 has a data manager 52 for performing various processing tasks, i.e., generating imposed data, correcting parts content data, displaying previews, converting to PS files, merging files, and managing a data base.

Data supplied from the monochromatic scanner 14, the color scanner 15, and the workstations 17 are converted in format by an input interface 36a, and the converted data are supplied to the data manager 52.

To the data manager 52, there are connected program modules functioning as an application program, i.e., a page layout editing module 61 (functioning as a page layout application) for generating parts shapes, applying images to individual pages, and trimming images, an image processing module 62 for removing noise from images and sharpening image edges, an imposing module 63 (functioning as an imposing application) for determining positions where page layout data (individual page data) are to be assigned to leaf patterns to generate imposed data, and a data managing module 64 for managing data including image data and managing output jobs.

The data manager 52 manages storage and readout of leaf pattern data (also referred to as leaf patterns) 71, image data (also referred to as page data, page layout data, or individual page data) 72 in pages, and parts data 73 that are stored in the data disk 24.

The data disk 24 stores, as separate files, the leaf pattern data 71 composed of a plurality of pages, the page data 72 disposed in leaf patterns, the parts data 73 disposed in leaf patterns, and imposed data 74 (described later on).

Since these data 71, 72, 73, 74 are stored as separate files in the data disk 24, the data manager 52 can directly read the leaf pattern data 71, the page data 72, the parts data 73, and the imposed data 74 from the data disk 24 and individually correct (change or update) these data.

The leaf pattern data 71 basically has parts position data 71b indicating the positions of parts in leaf patterns, parts name data 71a indicating the names of parts, and page position and orientation data 71c indicating the positions and orientations of pages in leaf patterns.

The parts data 73 includes parts name data 73a indicating the names of parts and parts content data 73b indicating the shapes of parts.

In the illustrated embodiment, image data (data including at least one of character data, image data such as photographic data, and figure data) making up the page data 72 and the parts content data 73b of the parts data 73. are generated in advance using the image processing module 62 and the page layout editing module 61, and stored as the page data 72 and the parts content data 73b in the data disk 24.

The display unit 35 is connected through a display memory 77 to the data manager 52. The display memory 77 has a storage capacity represented by (the number of horizontal pixels×the number of vertical pixels×the number of bits per pixel) corresponding to the screen size of the display unit 35, and functions as so-called Pixmap. An image represented by the data stored in the display memory 77 is displayed on the display unit 35.

The data manager 52 merges leaf pattern data 71, page data 72, parts data 73, and imposed data 74 stored in the data disk 24 to generate data for the display memory 77, and supplies the generated data to the display memory 77. The data manager 52 also merges data 71–74 stored in the data disk 24 to generate so-called imposed data, and generates a PS file from the generated imposed data. The data manager 52 supplies the generated PS file through an output interface 36b to the PS printer 13, the film printer 16, or the workstations 17.

Figure 4:
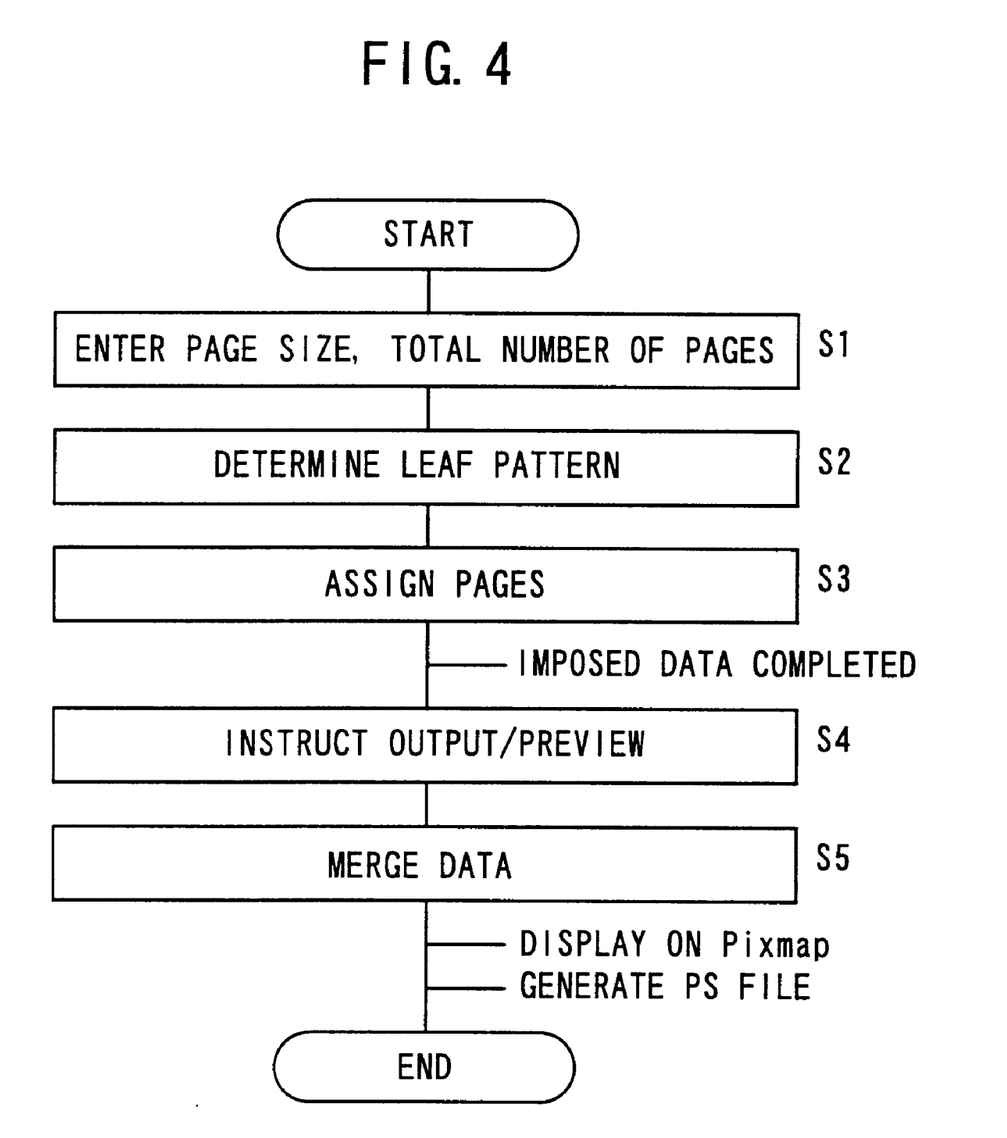
FIG. 4 is a flowchart of an operation sequence of the DTP system shown in FIG. 1.

Operation of the DTP system shown in FIGS. 1 through 3 will be described below with reference to an operation sequence shown in FIG. 4. The operation sequence shown in FIG. 4 is controlled by the data manager 52, and various processing steps of the operation sequence are carried out on an interactive basis between the data manager 52 and the operator using the mouse 31, the keyboard 32, the tablet 33, and the display unit 35.

Based on an action of the operator on the mouse 31 or the like, the data manager 52 starts the imposing module 63 to display a dialog for producing a new printed product, e.g., a book, on the display screen of the display unit 35.

In the dialog, the operator enters the total number of pages ("n" indicative of 1st to nth individual pages) of the book, the size (A4, B5, etc.) of individual pages, the title of the book, etc. Based on these entries, the data manager 52 determines the entered data, and stores them in a working area of the data disk 24 or the RAM 23 in step S1.

Then, based on the entered total number of pages and the size of individual pages, the data manager 52 determines the size of a leaf and determines a leaf pattern in step S2.

Figure 5:
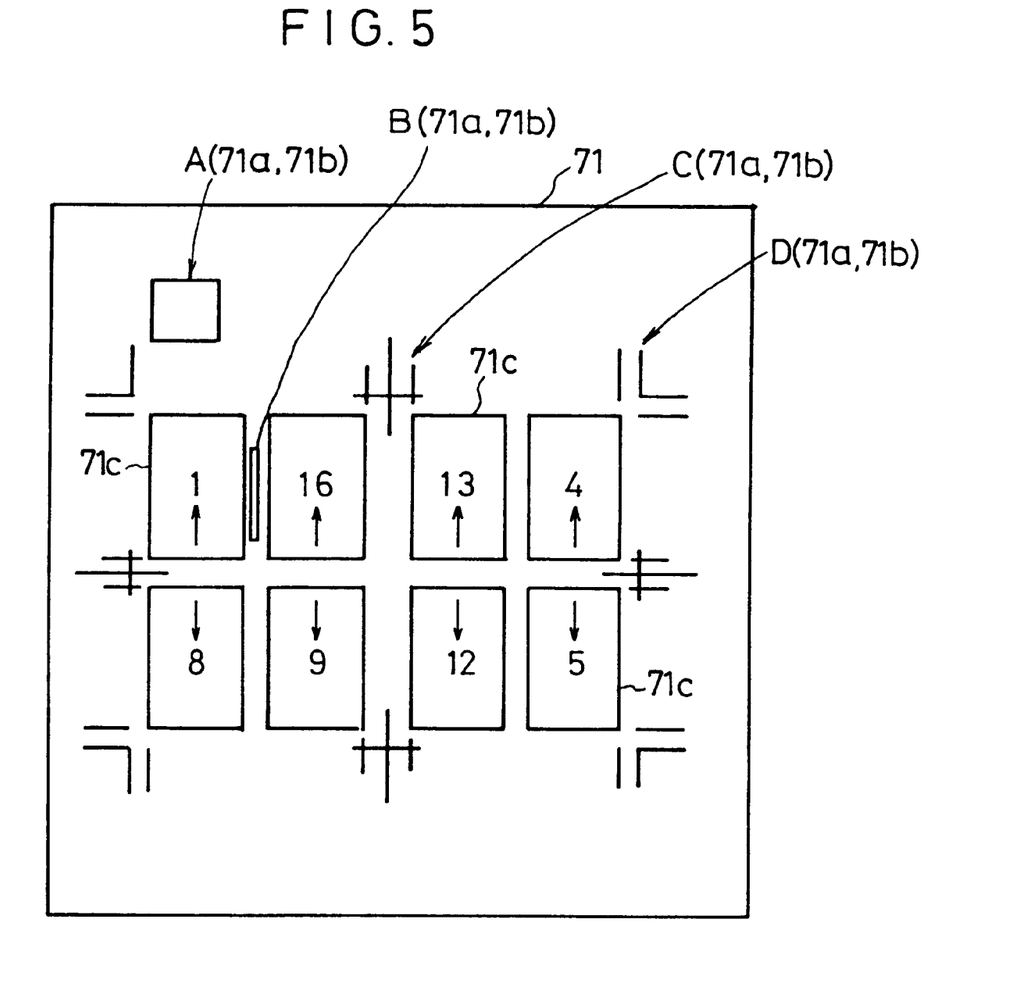
FIG. 5 is a schematic diagram showing a data structure of a leaf pattern.

FIG. 5 schematically shows a data structure of a determined leaf pattern (leaf pattern data) 71. As shown in FIG. 5, the leaf pattern data 71 includes parts name data 71a, parts position data 71b representing coordinate data which indicate the positions of parts, and page position and orientation data 71c representing the coordinate data which indicate the positions of individual pages and their orientations.

The leaf pattern 71 shown in FIG. 5 is displayed on the display screen of the display unit 35, and the operator can confirm the leaf pattern and determine and confirm positions where to insert parts on the displayed leaf pattern 71. In FIG. 5, a rectangular frame indicated by A (71a, 71b) indicates the position on the a leaf pattern data 71 of management data representing a color bar indicative of a color plate, a date, a producer's name, etc. indexed by parts name data 71a and parts position data 71b. Therefore, the leaf pattern data 71 is such a simple data structure that parts data is indicated solely by a rectangular frame on the leaf pattern data 71.

The actual shapes of figures and characters representing parts including color bars, producer's names, etc. have been stored as parts data 73. As shown in FIG. 3, the parts data 73 include parts name data 73a as an index and parts content data 73b representing the shapes of figures and characters.

In FIG. 5, a rectangular frame indicated by B (71a, 71b) indicates the position on the leaf pattern data 71 of a back signature indexed by parts name data 71a and parts position data 71b. Parts data is also indicated solely by a rectangular frame on the leaf pattern data 71. The actual shape of a back signature, i.e., the shape of characters of the product name and company name, is stored as parts data 73 together with management data, and the parts data 73 also include parts name data 73a as an index and parts content data 73b representing the shape of a back signature.

Lines indicated by C (71a, 71b) and D (71a, 71b) indicate register marks read from the parts content data 73b indexed by parts name data 71a and parts position data 71b. Parts data which are used in common, including register marks and back marks, are stored as system data in relation to the imposing module 63 as the parts data 73 in the data disk 24.

The frames A, B indicate the positions of management data and back signature data inherent to the operator, generated by the operator of the workstations 12, 17 using the page layout editing module 61. The operator can generate, if necessary, data different from register marks and back marks stored as system data, and store the generated data as the parts data 73. Those management data and back signature data which can be used in common can also be stored as system data.

The leaf pattern data 71 also includes page position and orientation data 71c indicating the positions (coordinates) of pages and the orientations (upward or downward) of page data (including characters, images, and figures) 72 finally disposed in individual pages. The orientations of individual pages represent orientational information which will be necessary when the pages will actually be printed so that the printed characters, images, and figures in the individual pages will look proper in orientation after the pages are bound. The leaf pattern 71 will be printed as a whole by a printing press.

The leaf pattern data 71 is data indicative of the positions and orientations of pages, and management data including the positions and names of parts. Since the leaf pattern data 71 does not contain shape data (content data) read from the monochromatic scanner 14 or the like or generated by the workstation 11, the leaf pattern data 71 comprises a relatively smaller amount of data, i.e., "light" data.

The leaf pattern data 71 shown in FIG. 5 represents a spine-right folded text including three folds and a total of 16 pages. Then, as many leaf pattern data 71 as the number produced by dividing total number of pages by 16 are generated. When the operator instructs the DTP system to display leaf pattern data 71 on the display unit 35, an image similar to the image shown in FIG. 5 is displayed on the display unit 35.

Figure 6:
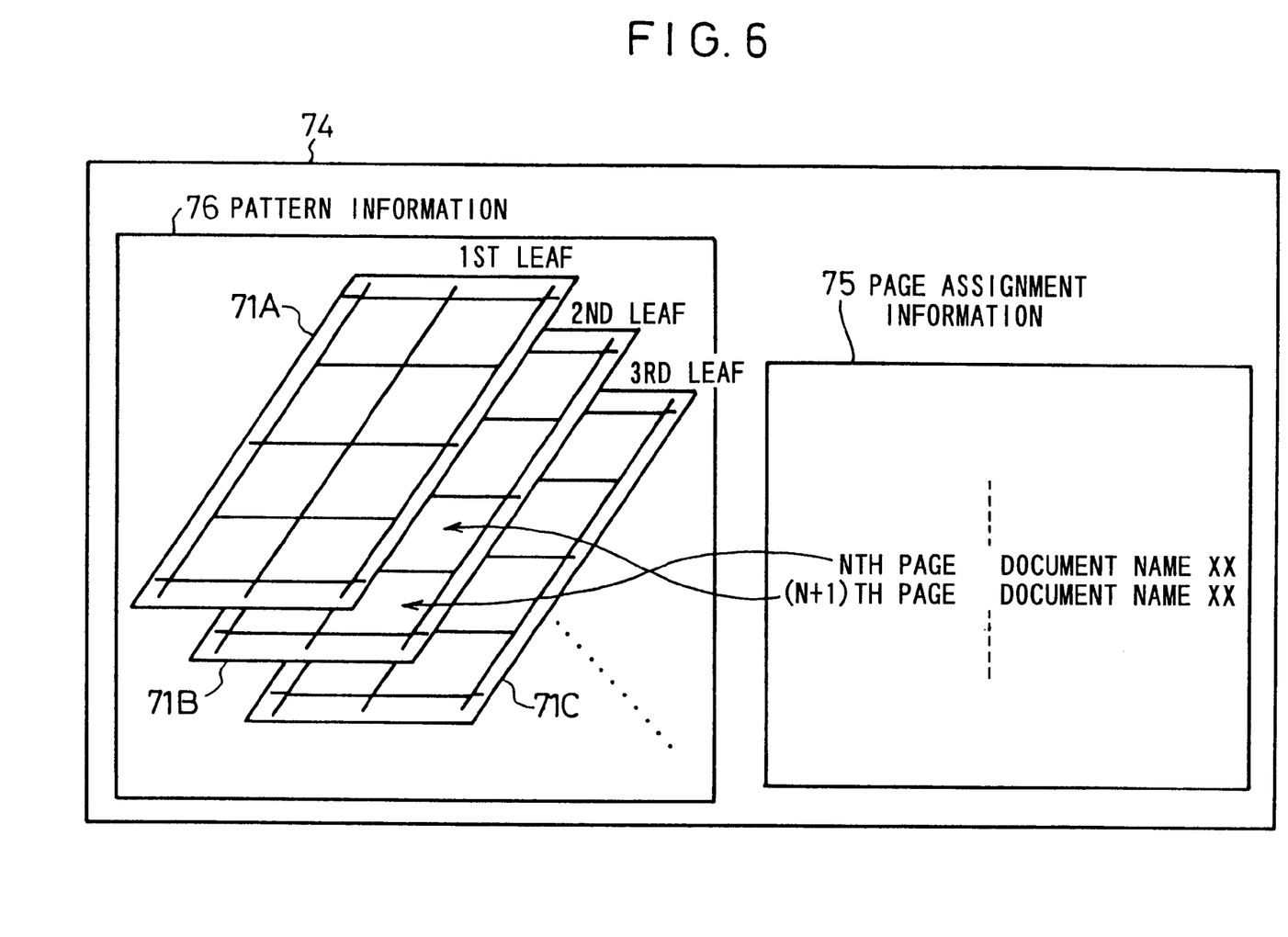
FIG. 6 is a diagram showing page assignment information and pattern information.

Then, as shown in FIG. 6, the operator assigns pages to leaf patterns in step S3. Specifically, page assignment information 75 includes page number information representing a 1st page, a 2nd page, . . . , an Nth page, an (N+1)th page, . . . , and document name xx information associated with the page number information. The page assignment information 75 determines which pages in a first leaf pattern 71A, a second leaf pattern 71B, and a third leaf pattern 71C in pattern information 76 the 1st page, a 2nd page, . . . , an Nth page, an (N+1)th page, . . . are to be assigned to. In FIG. 6, the Nth page is assigned to a lowermost left page in the second leaf pattern 71B, and the (N+1)th page to a second page up from the lowermost left page in the second leaf pattern 71B.

The page assignment process in step S3 deals with a small amount of data, i.e., "light" data, because the assignment information 75 includes page number information and document name xx information.

Imposed data 74 schematically shown in FIG. 6 is completed by the processing operation in steps S1–S3 described above. Until the imposed data 74 are generated, page data 72 representing actual images and parts content data 73b representing the shapes of parts are not contained in the leaf pattern data 71. Therefore, the amount of data to be handled is very small, i.e., light. Consequently, the load imposed on the system hardware is relatively small until imposed data is generated, and hence the time required to generate imposed data is relatively short.

For correcting the contents of page data 72 or parts content data 73b, whose amount is relatively large, applied to the leaf pattern data 71, the operator may read only those data to be corrected from the page data 72 or the parts content data 73b, and correct the data as desired using the page layout editing module 61 and the image processing module 62.

According to the embodiment of the present invention, therefore, the operator can correct page data 72 and parts content data 73b without correcting leaf pattern data 71 and imposed data 74. The operator can easily meet a request to change page data 72 from the person who has ordered the data of the book.

Figure 7:
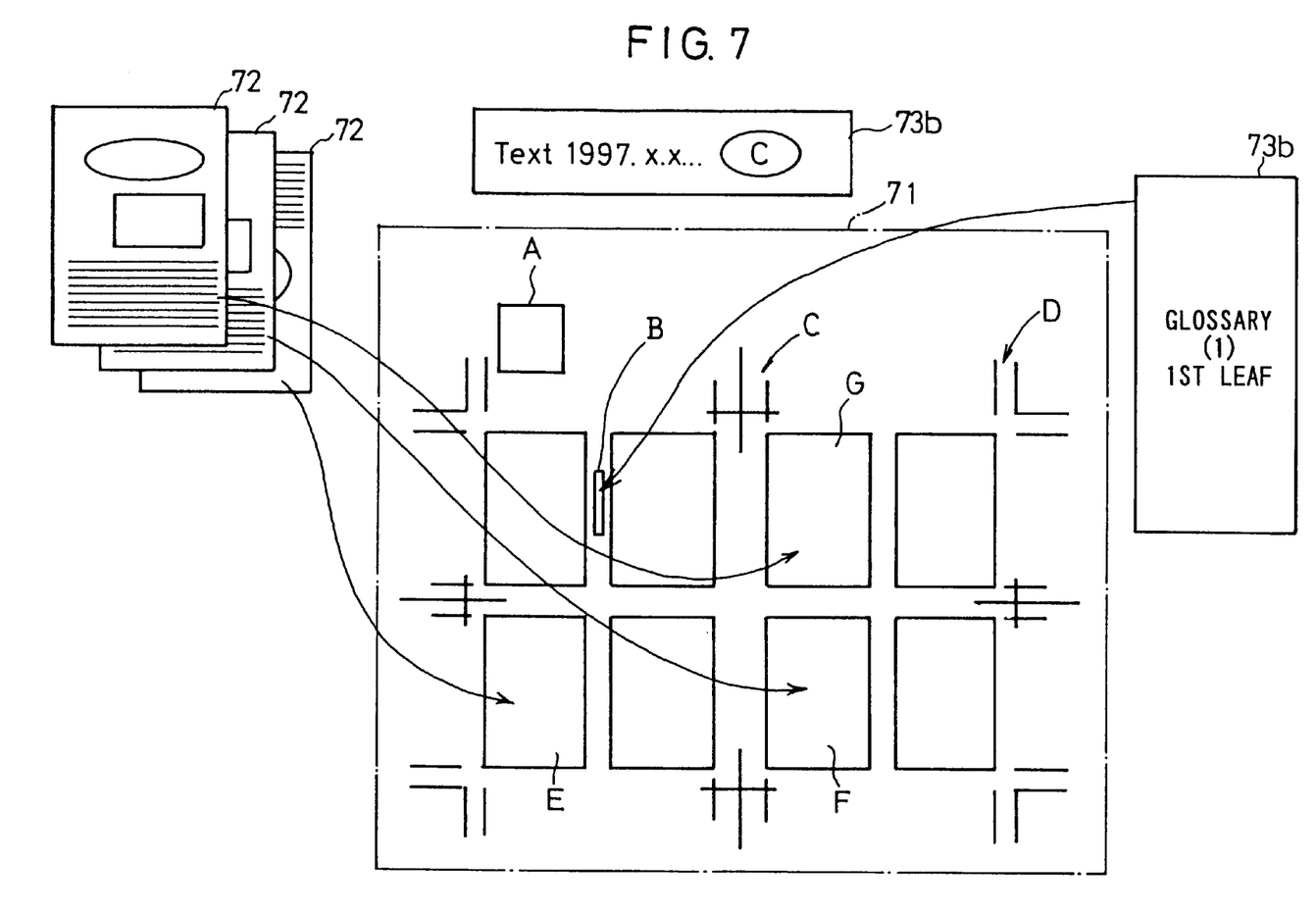
FIG. 7 is a diagram illustrative of a process of imposing page data including image data on a leaf pattern.

Then, when the operator instructs the DTP system to output and/or preview the data in step S4, then the data manager 52 merges the data in step S5 as shown in FIG. 7. Specifically, based on the imposed data 74 (including the page assignment information 75 and the pattern information 76 as shown in FIG. 6) and the leaf pattern data 71, the data manager 52 reads the page data 72 and the parts content data 73b representing actual images and parts shapes from the data disk 24, refers to the parts name data 71a, the parts position data 71b, and the page position and orientation data 71c, and assigns the page data 72 and the parts content data 73b which have been read to given positions in the leaf pattern data 71, thereby generating imposed pattern data comprising a combination of the leaf pattern data 71, the page data 72, and the parts data 73.

In FIG. 7, characters and symbols "Text 1997.x.x. . . . " which is a part as management data read from the parts content data 73b are assigned to a frame A, and characters "Glossary 1st leaf" which is a part as a back signature are assigned to a frame B. Page data 72 representing characters and images are assigned to individual pages E, F, G.

If the operator instructs the DTP system to display a preview image of the imposed pattern data, then the imposed pattern data thus generated is stored in the display memory 77 as Pixmap, and then supplied from the display memory 77 to the display unit 35. The operator can confirm a displayed image of the imposed pattern including the page data 72 and the parts data 73, i.e., an output image of the imposed pattern, on the display unit 35.

If the operator instructs the DTP system to output an image of the imposed pattern data, then the imposed pattern data thus generated is converted to a PS file, and the PS file is supplied through the interface 36b to the PS printer 13 or the film printer 16. The PS printer 13 or the film printer 16 produces a hard copy or a film, and the operator can confirm an output image of the imposed pattern data including the page data 72 and the parts data 73 on the hard copy or the film thus produced.

Specifically, the operator can easily confirm on the display unit 35 the imposed pattern in which the characters and symbols "Text 1997.x.x. . . . ", the characters "Glossary 1st leaf", and images of the page data 72 are applied to the leaf pattern data 71, more precisely the image of a leaf pattern represented by leaf pattern data. The operator can also generate a proof or a printing film representing the outputted imposed pattern on the PS printer 13 or the film printer 16. In this embodiment, only when the operator instructs the DTP system to output or preview imposed pattern data, actual data including page data 72, parts content data 73b, etc. are assigned to a leaf pattern 71 to generate imposed pattern data. In the leaf pattern data 71 and the imposed data 74, the parts position data 71b, the parts name data 71a, and the page position and orientation data 71c are referred to as indexes with respect to the page data 72 and the parts content data 73b.

Therefore, when the page data 72 and the parts content data 73b are corrected, the corrections can be reflected in outputted and/or previewed data without the leaf pattern data 71 and the imposed data 74 being corrected.

The processing based on the operator's instructions to output and preview imposed pattern data may be executed while pages are being assigned to leaf patterns in step S3 rather than when imposed data are completed after step S3. If the operator instructs the DTP system to preview imposed pattern data, for example, while pages are being assigned to leaf patterns, the operator can confirm at the time how the images of parts and pages are assigned to leaf patterns. The operator can thus confirm at a glance how the assignment of pages to leaf patterns is in progress, i.e., how much of imposed data is generated. The processing based on the operator's instructions to preview imposed pattern data may also be executed while a leaf pattern is being determined in step S2.

According to the present invention, as described above, leaf pattern data composed of a plurality of pages, parts data disposed in the leaf pattern data, and imposed data representing the numbers of individual pages assigned to pages in the leaf pattern data are managed separately from each other, and the leaf pattern data includes parts position data and parts name data.

Consequently, the parts data disposed in the leaf pattern data can be corrected without correcting the imposed data and the leaf pattern data, stated otherwise, the parts content data can be corrected irrespective of correction of the leaf pattern data, and hence only the parts content data can be corrected.

The actual shapes of parts data in leaf patterns can be corrected by handling a very small amount of data, and as a result, the time required to correct the actual shapes of parts data in leaf patterns is greatly reduced.

Since the leaf pattern data, the imposed data, and the parts data are individually managed, data resources can easily be used and reused.

If the parts content data includes data indicative of a particular one of color bars C, M, Y, K, then the operator can easily correct the data into data representing a particular color bar having a desired shape.

If the parts content data includes producer's name data, then the operator can easily correct the producer's name data into producer's name data in a desired character shape.

According to the present invention, furthermore, imposed data in which page information is assigned to a leaf pattern, and actual image data of pages are stored separately from each other, and thereafter, in response to display instructions, the imposed data are referred to, the actual image data are assigned to pages in the leaf pattern, and the leaf pattern with the actual images inserted in the pages is displayed on the display unit.

Therefore, the operator can easily confirm the leaf pattern with the actual images inserted in the pages on the display unit, and hence can easily confirm pages with image data already assigned thereto and pages with no image data assigned thereto.

Since information of parts and parts content data representing the actual shapes of the parts are provided, actual images in a leaf pattern and the images of the parts disposed in the leaf pattern can be displayed in combination on the display unit.

Although certain preferred embodiments of the present invention have been shown and described in detail, it should be understood that various changes and modifications may be made therein without departing from the scope of the appended claims.

What is claimed is:

1. A method of laying parts in a leaf pattern, comprising:
managing leaf pattern data composed of a plurality of pages, parts data disposed in said leaf pattern data, and imposed data representing numbers of individual pages assigned to pages in said leaf pattern data, wherein each of said leaf pattern data, said parts data, and said imposed data is electronically managed independently from each other;
said parts data including parts name data representing names of parts and parts content data representing shapes of the parts;

said leaf pattern data including parts position data representing positions of the parts, parts name data representing names of the parts disposed in said positions, and page position and orientation data representing positions and orientations of the pages; and correcting contents of the parts disposed in said leaf pattern data by correcting said parts content data of said parts data.

2. A method according to claim 1, wherein said parts content data includes at least data indicative of a particular one of color bars C, M, Y, K.

3. A method according to claim 1, wherein said parts content data includes at least back signature data representing characters including a product name.

4. A method according to claim 1, wherein said parts content data includes at least producer's name data representing a producer's name.

5. A method according to claim 1, wherein said parts content data includes at least date data representing a date of production.

6. A method according to claim 1, wherein said parts content data includes at least one of register mark data and back mark data.

7. A method of displaying a leaf pattern, comprising:

determining a leaf pattern;

thereafter, electronically storing imposed data in which information of pages is assigned to the determined leaf pattern and actual image data of the pages, wherein each of said imposed data and said actual image data is electronically stored independently from each other;

referring to said imposed data and automatically assigning said actual image data of the pages in said leaf pattern in response to display instructions; and displaying said leaf pattern in which said actual image data are assigned to the pages.

8. A method according to claim 7, further comprising the step of:

displaying said leaf pattern or a state of assignment of images to said leaf pattern in response to display instructions while said leaf pattern is being determined or the information of pages is being assigned to the determined leaf pattern.

9. A method of displaying a leaf pattern, comprising:

determining a leaf pattern;

thereafter, electronically storing imposed data in which information of parts and information of pages are assigned to the determined leaf pattern, parts content data representing actual shapes of the parts, and actual image data of the pages, wherein each of said imposed data, said parts content data, and said actual image data is electronically stored independently from each other;

referring to said imposed data, automatically assigning said parts content data to said leaf pattern, and automatically assigning said actual image data to the pages in said leaf pattern in response to display instructions; and displaying said leaf pattern in which images of the parts are inserted and said actual image data are assigned to the pages.

10. A method according to claim 9, wherein said images of the parts include at least data indicative of a particular one of color bars C, M, Y, K.

11. A method according to claim 9, wherein said images of the parts include at least back signature data representing characters including a product name.

12. A method according to claim 9, wherein said images of the parts include at least producer's name data representing a producer's name.

13. A method according to claim 9, wherein said images of the parts include at least date data representing a date of production.

14. A method according to claim 9, wherein said images of the parts include at least one of register mark data and back mark data.

15. A method according to claim 9, further comprising the step of:

displaying said leaf pattern or a state of assignment of the images of the parts and actual images of said leaf pattern in response to display instructions while said leaf pattern is being determined or the information of parts and the information of pages are being assigned to the determined leaf pattern.

* * * * *